United States Patent [19]

Denny et al.

[11] 4,177,168

[45] Dec. 4, 1979

[54] CATALYST BED FOR USE IN A CATALYTIC FLAMELESS HEATER DEVICE

[75] Inventors: Patrick J. Denny, Stockton-on-Tees; David L. Harrison; Martyn H. Stacey, both of Runcorn, all of England

[73] Assignee: Imperial Chemical Industries Limited, London, England

[21] Appl. No.: 519,656

[22] Filed: Oct. 31, 1974

[30] Foreign Application Priority Data

Nov. 7, 1973 [GB] United Kingdom .............. 51593/73

[51] Int. Cl.$^2$ ...................... B01J 23/64; B01J 23/72; B01J 23/74
[52] U.S. Cl. .................... 252/470; 252/471; 252/472; 252/474; 252/477 R
[58] Field of Search ............... 252/477 R, 455 R, 470, 252/471, 472, 474; 106/50

[56] References Cited

U.S. PATENT DOCUMENTS

| | | | |
|---|---|---|---|
| 3,162,607 | 12/1964 | Burbidge et al. | 252/477 R |
| 3,560,408 | 2/1971 | Kiehl et al. | 252/463 |
| 3,632,709 | 1/1972 | Hayes et al. | 252/477 R |
| 3,697,447 | 10/1972 | Bettinardi | 252/477 R |
| 3,799,796 | 3/1974 | Hunter | 252/477 R |
| 3,802,856 | 4/1974 | Kweller | 252/477 R |
| 3,843,561 | 10/1974 | Sobel | 252/477 R |
| 3,861,853 | 1/1975 | Petrow | 252/477 R |

*Primary Examiner*—W. J. Shine
*Attorney, Agent, or Firm*—Cushman, Darby & Cushman

[57] ABSTRACT

A catalyst bed comprising synthetic inorganic polycrystalline fibres, especially alumina or zirconia, having a BET surface area of 5 to 200 m$^2$/g and a bulk density of 0.01 to 0.2 g/cc used to support 0.01% to 0.5% by weight of a Group 8 metal, e.g., platinum; used for the catalytic oxidation of a vaporous fuel such as butane in devices such as flameless heaters for use in caravans, hatcheries, greenhouses, etc.

1 Claim, 3 Drawing Figures

CATALYST BED FOR USE IN A CATALYTIC FLAMELESS HEATER DEVICE

This invention relates to a catalytic bed for an oxidation device and in particular for flameless heaters of the catalytic type.

It is known that inorganic fibres such as asbestos and vitreous ceramic fibers can be coated with catalysts and used in catalytic heaters. Such heaters are not entirely satisfactory as the fibres are fragile and the activity of the catalyst falls off rapidly with time due to poor adhesion of the catalyst to the fibre surface and to the presence of hot spots arising from non-uniformity of fibre and catalyst distribution. Hot spots also tend to cause local decomposition of asbestos fibre. Such heaters also require a large loading of expensive catalysts such as platinum and they are not efficient for the combustion of fuels containing high amounts of olefinic hydrocarbons.

We have now found that improved catalytic oxidation devices such as flameless heaters may be produced by using synthetic polycrystalline inorganic fibres as a support for the combustion catalyst used in such devices.

According to the invention there is provided a catalyst bed for use in a catalytic device for the oxidation of a vaporous fuel comprising synthetic inorganic polycrystalline fibres and a combustion catalyst supported by the fibres, said catalyst comprising a metal of Group 8 of the Periodic Table of the Elements and present at a concentration of 0.01% to 0.5% by weight of the fibres, said fibres having a BET surface area of 5 to 200 square meters per gram and a bulk density in the bed of 0.01 to 0.2 gram per cubic centimeter.

The expression 'vaporous fuel' includes any fuel in the gaseous or vapour state.

The device using the catalyst bed according to the invention is applicable especially to fuels having a boiling point at atmospheric pressure below 220° C., more especially to fuel which are gaseous or which have a vapour pressure of greater than one atmosphere at room temperature (say 20° C.), for example methane, ethane, propane and butanes, and olefines such as propylene and butenes. Commercially-available fuels such as natural gas, town gas, liquefied natural gas, liquefied petroleum gases and various waste hydrocarbon gases are very suitable. The invention is also applicable, however, to vaporisable fuels such as kerosene and other liquid hydrocarbon fuels which can be vaporised to provide a vaporous fuel, or to "permanent" gas fuels such as hydrogen, which may be diluted with an inert gas such as nitrogen to control the temperature of combustion.

The combustion catalyst is preferably platinum, palladium or rhodium, or combinations thereof. Combinations of one or more Group 8 metals with one or more non-noble metals or their oxides may be used; for example one or more of the oxides of chromium, cobalt, copper, manganese or iron may be present in addition to a Group 8 metal. The catalyst is normally substantially uniformly distributed on or in the support fibre. For some embodiments, however, it is advantageous for an extra quantity of catalyst to be present in selected parts of the catalyst bed, for example an outside face. The catalyst may be present as a surface layer on the fibre, as part of a surface layer containing other materials such as binders or as a part of the fibre itself, or any combination thereof. When the catalyst is part of the fibre itself, it is convenient for the catalyst, or a precursor thereof, to be included in the composition from which the fibre is prepared, as hereinafter described. When the catalyst is present as a surface layer, it may be deposited on the fibres by any convenient method, for example spraying on or immersion in a solution of a soluble salt of the catalyst and decomposing to the metal or oxide of the catalyst as the case may be, normally by heating. Suitable methods for the deposition of catalysts such as noble metals are well-known in the art. For example, chloroplatinic acid solution or solutions of complex platinum amines are used for the deposition of platinum metal on alumina and other supports.

The surface characteristics, surface area and porosity of synthetic inorganic polycrystalline fibres can be more readily and accurately controlled than those of glassy or natural inorganic fibres, and these properties are especially important for the present invention. Polycrystalline fibres have generally much higher surface areas and porosities than vitreous fibres. Other physical properties, for example specific heat, strength, bulk density, uniformity of fibre diameter distribution, and freedom from shot are also important properties of the practice of the invention; synthetic inorganic polycrystalline fibres generally have properties which satisfy these requirements more readily than vitreous fibres made by melt-spinning of ceramic materials or natural inorganic fibres such as asbestos.

Preferred fibres are polycrystalline metal oxide fibres, especially such fibres comprising alumina, zirconia, titania, thoria, alumina/silica or zirconia/silica.

Synthetic polycrystalline inorganic fibres are conveniently prepared by fibrising a sol or solution, preferably an aqueous sol or solution, of a salt or other compound convertible to the material of which the fibre consists. Suitable methods are described in UK patent specification No. 1,098,595—U.S. Pat. No. 3,322,865. The said fibres are especially conveniently prepared by methods in which the aforementioned sol or solution comprises additionally a co-dissolved organic polymer, particularly a linear organic polymer. In these methods, fibres are formed by fibrising a composition having a viscosity of greater than 1 poise comprising an aqueous solution or sol of a metal compound, for example an oxychloride, basic acetate, basic formate or nitrate of a metal, especially of aluminium and/or zirconium, and a minor proportion of a water-soluble organic polymer, preferably polyethylene oxide, polyvinyl alcohol, or polyvinyl pyrrolidone, drying the fibre formed and heating to decompose the metal compound to oxide and to decompose the polymer.

As hereinbefore stated, the surface area, porosity and surface properties generally of the fibre are important in determining its effectiveness as a suitable support for the catalyst. Surface areas are generally expressed as BET surface area in square meters ($m^2$) per gram of fibre. BET surface areas in the range 5 to 200 $m^2/g$ are suitably employed for the invention, since a highly available catalytic surface is important for combusting all the fuel with small amounts of catalyst. A porosity of 5% to 60% is preferred, especially 5% to 30%. However, if the pores are too small, an apparently high surface area may not be satisfactory, and pore volumes of 0.005 to 0.25 cc/gram fibre are preferred; alternatively a mean pore radius of at least 20 Angstroms is preferred.

A substantially uniform fibre diameter distribution is preferred as this results in even gas distribution throughout the catalyst bed and avoids the development of hot spots. Thus fibres of small diameter, for example 0.5 to 5.0 microns average diameter may advantageously be used especially as the small diameter improves the flexibility of the fibre. The fibres should also preferably be substantially free from shot to facilitate gas distribution and to minimise blockage of fuel pipes with particulate matter. Relatively shot-free fibres with uniform and small diameters may conveniently be made by a blowing process as hereinafter described.

Specific heat is an important property in determining the relative effectiveness of the fibres for use in the invention. A catalyst bed having fibres of low specific heat will warm up or cool down faster than a bed of the same weight having fibres of high specific heat. Zirconia fibres have for example much lower specific heat values than many conventional inorganic fibres such as asbestos and mineral fibres.

The catalyst bed is required to be reasonably robust and therefore the fibres used therein should not be weak and easily damaged during handling such as occurs when the fibres are treated with the catalyst or when they are mounted in a catalytic heater or suffer deterioration in physical properties at high temperatures. Small diameter polycrystalline metal oxide fibres, for example alumina or zirconia fibres of 0.5 to 5 micron diameter are relatively very strong inorganic fibres compared with natural or vitreous fibres especially under hot conditions, and are thus very suitable for the invention.

Zirconia is especially useful for the fibres of some embodiments of the invention as, unlike many other fibre materials, for example asbestos, alumino-silicates and alumina, it is not a cracking catalyst, and thus when the fuel contains unsaturated hydrocarbons, coking problems are greatly reduced. This leads to longer catalyst life.

Polycrystalline inorganic fibres having the aforementioned desirable characteristics of small and uniform diameter, high surface area and porosity, strength and shot-freedom are conveniently produced by a blowing process described in UK patent specification No. 1,360,197. This process comprises extruding a fibrising composition, for example one of those hereinbefore described, through one or more apertures, preferably 50–500 microns diameter, into at least one gas stream having a component of high velocity in the direction of travel of the extruded composition. It is convenient to use two streams of gas which converge, preferably at an angle of 30° C. to 60° C., at or near the point where the composition is extruded from the aperture so as to draw down the fibre. Air is the preferred gas. The rate of removal of water from the composition is conveniently controlled by mixing the gas with water vapour, for example air at a relative humidity of greater than 80% may be used. The fibres are collected as staple in a random mat form, and then fired at 1000° C. to 2000° C. Alumina, alumina/silica or zirconia fibres suitable for the invention are conveniently made by this process.

The fibres may be used loose, with exterior support in the form of, for example, one or more metal meshes or perforated plates. Alternatively they can be self-supporting as a result, for example, of bonding by a suitable refractory material such as a refractory oxide produced from colloidal or dissolved inorganic oxy compounds such as hydrated oxide sols, for example sols of alumina, fibrous boehmite, silica, titania, zirconia or mixtures of two or more of these. The fibres may also be made self-supporting by stitching or needling. A generally useful arrangement is a mat of fibre bound with a low concentration of inorganic binder having an external support comprising a metal mesh. The fibre forms may be arranged in a wide variety of geometrical structures; for example papers and felts may be used pleated, corrugated, embossed or perforated.

The fuel and oxygen (usually as air) can be mixed before contacting the catalyst; or, as is common in catalytic heaters, the fuel may be passed through the catalyst bed from one side and reacted with oxygen diffusing into the bed from the other side. A combination of such primary and secondary oxygen may be used.

Distribution of the fuel to the catalytic bed may be conveniently improved by interposing a layer of non-catalytic fibres between the fuel supply and the bed and covering substantially the face of the bed exposed to the fuel. Such fibres may also act as a flame-trap. Polycrystalline inorganic fibres may be used for this purpose or any other suitable fibre e.g. mineral wool.

The depth of the catalyst bed is suitably in the range 0.02 to 15 cm especially 0.02 to 1 cm. The density of packing of the fibres is chosen in relation to the heat output per unit volume required, and the bed is constructed such as to give a bulk density of 0.01 to 0.2 gram per cubic centimeter.

The temperature of the fibres at the combustion zones is usually from 200° C. to 600° C. but may reach temperatures as high as about 1000° C. The polycrystalline inorganic fibres used, especially alumina and zirconia, are remarkably stable at these temperatures, in contrast to asbestos fibres, which become very fragile at just below 500° C. and glass or mineral wools which tend to fuse locally and deteriorate physically due mainly to de-vitrification.

The rate of fuel supply to the catalyst bed is chosen for the heat output required, when for example the device is used for heating applications, and is also related to the thickness and face area of the catalyst bed. As a typical example, 20 to 150 liters her hour of liquefied petroleum gas may be fed to a bed of about 1 sq. foot face area comprising about 20 grams of zirconia fibre containing about 0.1% by weight of platinum when air diffuses to the front face of the bed and is not pre-mixed with the fuel.

The combustion reaction is normally started by thermal ignition, which may be effected for example by means of a pilot light or by electrical ignition. The light-up time, that is the time necessary for the catalyst bed to reach operating temperature, for alumina fibre is about a third of that for alumino-silicate or quartz fibres.

Devices for oxidation of vaporous fuels according to the invention find many uses. The principle use is for flameless heaters of the catalytic type, commonly used for space heating of homes, factories, caravans, hatcheries, greenhouses, drying rooms and the like.

A simple form of flameless heater is shown in the accompanying drawing in which

Figure 1:
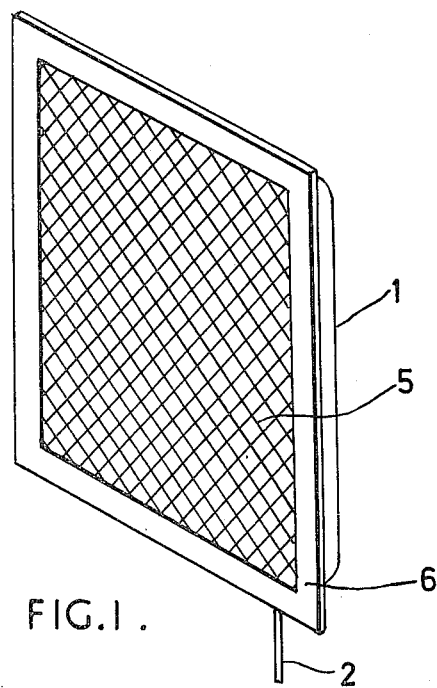
FIG. 1 is a general view of the heater.
Figure 2:
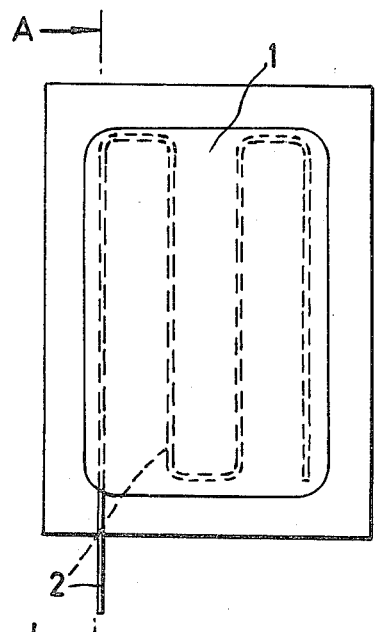
FIG. 2 is an end elevation showing the back of the heater.
Figure 3:
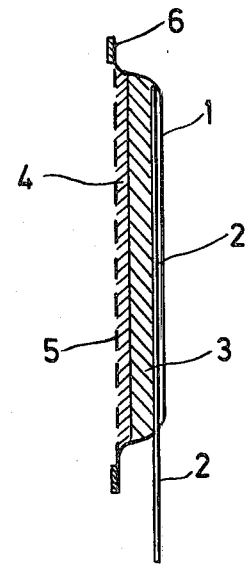

FIG. 3 is a sectional view through A–A$^1$ of FIG. 2 and comprises a shallow metal tray (1) the base of which is fitted with a gas distribution pipe (2) perforated at intervals of 2 centimeters, to allow uniform distribution of gaseous fuel, above which is a layer of non-catalytic fibre (3) which serves to further distribute the gas and act as a flame trap; above this layer is the catalyst bed (4) retained by a wire mesh (5), the whole being sealed by metal strips (6) which are crimped or otherwise fastened to hold the edges of the tray (1) and mesh (5) together. The oxygen necessary for combustion is drawn from the surrounding air which passes over the front face of the catalyst bed (4) and diffuses back into the bed to react with the fuel in the presence of the catalyst.

The very small concentration of catalyst required in the beds according to the invention especially those comprising alumina or zirconia fibres is a considerable advantage and it is found that even at the small concentrations used, the active life of the catalyst is sufficient to ensure long running times (at least 2000 hours) for the heaters even when subjected to repeated start-up procedures. Ignition is easy and safe, the catalyst bed is robust and heat-up and cool-down times are short resulting in small release of uncombusted fuel.

The invention is illustrated by, but not limited to, the following Examples. Unless otherwise stated, the fuels used had the following compositions:

|  | % Lights | Propane | Propylene | Isobutane | n-Butane | Butenes |
|---|---|---|---|---|---|---|
| Butene-rich fuel | 1.7 | 3.6 | 15.2 | 3.8 | 10.0 | 65.0 |
| Butane-rich fuel | 0 | 10.4 | 0 | 36.8 | 32.4 | 20.4 |

EXAMPLE 1

A catalyst pad comprising 16 mg of platinum metal supported on 20 g of zirconia fibre was prepared by spraying aqueous chloroplatinic acid solution on to one face of loose fibre blanket and then drying the fibre pad. The zirconia fibre contained 8.5% of rare earth oxides as stabilisers of the tetragonal zirconia phase and it had the following physical properties:

| Fibre diameter | 1–4 microns |
|---|---|
| Shot content | Nil |
| Specific heat | 0.14 cal g$^{-1}$ °C.$^{-1}$ |
| Thermal conductivity | 0.06 Wm$^{-1}$ °K.$^{-1}$ at 250° C. for blanket of 6 lb/ft$^3$ bulk density |
| Tensile strength | $0.7 \times 10^3$ MNm$^{-2}$ |
| Young's Modulus | $1 \times 10^5$ MNm$^{-2}$ |
| BET Surface area | 5–20 m$^2$/g |
| Porosity | <20% |

In addition a diffuser pad of about 90 g of loose zirconia fibre with the properties described above was interposed between the sprayed face of the catalyst bed and the incoming fuel gas. The fibre pads were mounted in a commercially-available catalytic heater of the type described and the bulk densities of the fibre pads were 0.077 g/cm$^3$ (4.8 lb/ft$^3$) for the diffuser and 0.085 g/cm$^3$ for the catalyst.

The heater was operated for 1700 hrs including 450 hrs on butane-rich liquefied fuel and 1250 hrs on butene-rich liquefied fuel. Unsaturated fuel is considered to give a more severe test of catalyst life. Fuel flow rates were in the range 37–43 liters/hr$^1$ (gas) and the heater was subjected to 70 start-up and shut-down sequences. The maximum temperature measured at the catalyst face was typically 500°–600° C. and the temperature of the outside face about 300° C. No detectable deterioration in performance was observed throughout the period of testing.

This heater was subjected to a typical light-up procedure of a commerical catalytic heater. The procedure consisted of the following steps:

(a) Purging the pilot light line for several seconds with fuel gas, (b) Metering fuel gas through the pilot light line at 144 liters/hr$^1$ for 30 seconds with the pilot light lit, (c) Metering 40 liters/hr$^1$ to the gas distributor pipe.

The heater described in this example reached and passed 200° C., measured on the catalyst surface at the top of the catalyst pad, within 4½ mins, 2 mins before commercial heaters containing 300 and 105 mg of platinum metal respectively.

This illustrates the rapid warm-up characteristics of catalytic heaters using low quantities of platinum metal on the zirconia fibre.

EXAMPLE 2

A catalyst pad comprising 138 mg of platinum metal supported on 69 g of zirconia fibre was prepared by soaking the loose fibre blanket in a solution containing chloroplatinic acid. The fibre pad was then allowed to dry. A diffuser pad of about 90 g of loose zirconia fibre of the same type was interposed between the sprayed face of the catalyst bed and the incoming fuel gas. Both the catalyst and diffuser pads were made of zirconia of the type described in Example 1 and they were mounted in a commercially available catalytic heater of the type described hereinbefore. The exposed area of the fibre was 14 inch × 11 inch and the bulk densities of the fibre pads were 0.077 g/cm$^3$ for the diffuser and 0.149 g/cm$^3$ for the catalyst.

The heater was operated on butane-rich fuel throughout the flow range 22–90 liters/hr$^1$ and with typical maximum temperatures of 500°–600° C. Heat output compared favourably with that of commercially-available catalytic heaters and no unburnt fuel gases were detected.

EXAMPLE 3

A catalyst pad comprising 4.5 mg of platinum metal supported on 22 g of alumina fibre was prepared by spraying aqueous chloroplatinic acid solution on to one face of loose fibre blanket and then drying the fibre pad. The alumina fibre contained 5% silica and had the following properties:

| Fibre diameter | 1–4 microns |
|---|---|
| Shot content | Nil |
| Specific heat | 0.25 cal/g$^1$ °C.$^1$ |
| Thermal conductivity | 0.07 Wm$^{-1}$ °K.$^{-1}$ at 250° C. for blanket of 6 lb/ft$^3$ bulk density |
| Tensile strength | $1 \times 10^3$ MNm$^{-2}$ |
| Young's Modulus | $1 \times 10^5$ MNm$^{-2}$ |
| BET Surface area | ca. 160 m$^2$/g |
| Porosity | <30% |

A diffuser pad of about 90 g of loose zirconia fibre of the type described in Example 1 was interposed between the sprayed face of the catalyst bed and the incoming fuel gas. Both the catalyst and diffuser pads were mounted in a commercially-available catalytic heater of the type described hereinbefore. The exposed area of the fibre was 14 inch × 11 inch and the bulk densities of the fibre pads were 0.077 g/cm$^3$ for the diffuser and 0.094 g/cm$^3$ for the catalyst.

The heater was operated on butane-rich, butene-rich and propylene fuels throughout the flow-range 22–90 liters/hr[1] of gas and with typical maximum temperatures of 500°–600° C.

With all the fuels the heat output compared favourably with that of commercially-available catalytic heaters and no unburnt fuel gases were detected.

EXAMPLE 4

A catalyst pad comprising 4.8 mg of platinum metal supported on 18 g of zirconia fibre paper was prepared by spraying aqueous chloroplatinic acid solution on to one face of the paper and then drying the paper. Zirconia fibre of the type described in Example 1 was used together with 10% by weight of boehmite sol and 10% by weight of fine diameter glass fibre in a conventional paper-making process to prepare the paper.

A diffuser pad of about 90 g of loose zirconia fibre of the same type was interposed between the sprayed face of the catalyst bed and the incoming fuel gas. Both this pad and the impregnated zirconia paper were mounted in a commercially available catalytic heater of the type described hereinbefore. The exposed area of the fibre was 14 in × 11 in and the bulk densities of the pad and paper were 0.077 g/cm$^3$ and 0.194 g/cm$^3$ respectively.

The heater was operated on butane-rich fuel within the flow range 22–90 liters/hr[1] of gas and with typical maximum temperatures of 500°–600° C. Heat output compared favourably with that of commercially available catalytic heaters and no unburnt fuel gases were detected.

EXAMPLE 5

A catalyst pad comprising 10.45 mg of platinum metal supported on 20 g of alumina fibre, was prepared by spraying aqueous chloroplatinic acid solution on to the loose fibre blanket which was subsequently allowed to dry. 9.5 mg of platinum was sprayed on to the back face of the pad, adjacent to the diffuser pad, as in the previous Examples. A further 0.95 mg of platinum was sprayed on to the front face of the pad. The alumina fibre used contained 5% silica and possessed the properties described in Example 3. A pad of about 90 g of loose zirconia fibre of the type described in Example 1 was used as a diffuser for the incoming fuel gas. Both the catalyst and diffuser pads were mounted in a commercially available catalytic heater of the type described hereinbefore. The exposed area of the fibre was 14 in × 11 in and the bulk densities of the fibre pads were 0.077 g/cm$^3$ for the diffuser and 0.085 g/cm$^3$ for the catalyst.

The heater was subjected to the light-up procedure described in Example 1 using butane-rich fuel. It reached and passed 200° C., measured on the catalyst surface at the top of the catalyst pad, within 2¾ min, 3¾ min before commercial heaters containing 300 and 105 mg of platinum metal respectively. Heat output was good and the heater operated well on fuel flow rates from 20–140 liters/hr[1] with no detectable emission of unburnt fuel gases.

The heater operated equally well on propane and propylene fuels and for all these fuels the heat output compared favourably with that of commercially available heaters.

EXAMPLE 6

The heater described in Example 1 was operated for a further 3750 hours on butene-rich liquefied fuel. No significant change in the heat output was detected during this further period of testing.

The percentage "slip" at the beginning and end of the further period was as follows:

| Hrs on butene-rich fuel | 1700 | 5000 |
|---|---|---|
| % slip | 5.8 | 9.4 | showing that little change had taken place in the percentage of unburnt fuel in the extra running time.

EXAMPLE 7

The following example illustrates the improved properties obtainable from a catalytic heater by using an alumina fibre of high BET surface area compared with a vitreous alumina silicate fibre which has a surface area less than 0.5 m$^2$/g.

A 48 g pad of alumina fibre having the characteristics described in Example 3 was prepared by spraying 180 cc of a solution containing 0.14 g of chloroplatinic acid dissolved in a 50/50 mixture of methanol and water. The pad was prepared by spraying two-thirds of the solution on the face of the pad open to the air when mounted in the heater and one-third of the solution on to the back face. The pad was dried at 80° C. overnight and fired at 600° C. for 30 minutes. It was placed in a heater of the type described hereinbefore. The heater was lit by the procedure described in Example 1 and run for 5 hours at 40 liters/hr to come to temperature equilibrium. The percentage unburnt hydrocarbon was measured by collecting the residual gases in a hood which fitted over the top of the heater, and analysing a small sample of the gas in a conventional chromatograph.

The % slip for this heater was thus 0.4% when the heater was fuelled by unsaturated butene-rich gases and 0.9% when using saturated butane-rich gases.

A comparative test was carried out using a pad of the vitreous alumino-silicate fibre having a density of 6 lb/cu.ft. and weighing 80 g. This was sprayed with the same quantity of platinum and in the same manner as for the alumina pad and tested in the same way. The % slip was 6.3% using saturated gas and 5.1% when running on unsaturated gas.

EXAMPLE 8

This example illustrates the lifetime of an alumina fibre pad compared with a vitreous alumino-silicate fibre pad when run on butane-rich gases.

An alumina pad made of fibre having the characteristics given in Example 3, weighing 23 g and measuring 14 inch × 12 inch × ½ inch was impregnated with an aqueous solution of a platinum salt so as to contain 0.3% platinum (690 mg Pt/m$^2$).

The aqueous impregnating solution was prepared by adding enough 0.880 ammonia to 250 mls of a chloroplatinic acid solution containing 200 μg Pt/ml to bring the pH to 11.2. The solution was then boiled until it became colourless and subsequently cooled and diluted to 2500 mls. Finally the pH was adjusted to 9.2 with dilute hydrochloric acid.

The fibrous mat was then totally immersed in this solution, agitated for half an hour and washed with three 1000 ml batches of water. After rolling free of excess water, the mat was air-dried at 80° C. and fired at 600° C. for half an hour. The pad then contained 0.3% Pt by weight uniformly distributed through the pad.

The percentage slip measured was as follows:

| hrs | 0 | 170 | 340 | 550 |
|---|---|---|---|---|
| % slip | 4 | 4.5 | 6.2 | 2.4 |

By contrast the vitreous alumino-silicate fibre pad having a density of 6 lb/cu. ft and weighing 80 g prepared and tested in the same way gave the following measurements:

| hrs | 0 | 25 | 170 | 340 | 460 |
|---|---|---|---|---|---|
| % slip | 5.1 | 7.5 | 34 | 46 | 56 |

EXAMPLE 9

This example illustrates the high activity of boards made from alumina fibre when coated with low levels of platinum.

A board was made from alumina having the properties described in Example 3 bound together with 20% by weight of colloidal boehmite and fired at 1000° C. The board was 14 inch×12 inch×¼ inch and weighed 160 g. It was impregnated with platinum by spraying with 25 mg Pt on the front face and 15 mg Pt on the back. The platinum was sprayed on in the form of a solution of 0.1 g of chloroplatinic acid dissolved in 20 mls of a 50/50 mixture of methanol and water. After drying and firing the board was mounted in a heater of the type hereinbefore described and run at 40 liters/hr of gas. The slip level for butene-rich gas was 0.8% and for butane-rich gas 2.2%.

EXAMPLE 10

This example illustrates the use of the high surface area of alumina when platinum in combination with a base metal oxide is used as catalyst.

An alumina fibre pad weighing 30 g was loaded with 2.4 g chromium oxide and 150 mg platinum. The BET surface area of the fibres was 145 $m^2/g$. The pad was mounted in a heater of the type described hereinbefore. At a fuel rate of 40 liters/hr the slip values were 0.3% for butene-rich gas and 0.5% for butene-rich gas.

By contrast a pad of crysotile asbestos fibre weighing 65 g and containing 3.75 g of chromium oxide and 300 mg platinum had a BET surface area of 12 $m^2/g$. This pad when fed with fuel at 40 liters/hr gave slip values of 1.0% for butene-rich gas and 0.0% for butane-rich gas.

We claim:

1. A catalyst bed for use in a catalytic flameless heater device for the oxidation of a vaporous fuel consisting essentially of synthetic inorganic polycrystalline metal oxide fibers and a combustion catalyst supported by the fibers, said catalyst comprising a metal selected from the group consisting of platinum, palladium and rhodium and present at a concentration of 0.01% to 0.5% by weight of the fibers, said catalyst is combined with a metal oxide selected from the group consisting of the oxides of chromium, cobalt, copper, manganese and iron, said fibers having a BET surface area of 5 to 200 square meters per gram and a bulk density in the bed of 0.01 to 0.2 grams per cubic centimeter.

* * * * *